US00RE35621E

United States Patent [19]

Schmalz

[11] E Patent Number: Re. 35,621

[45] Reissued Date of Patent: Oct. 7, 1997

[54] CARDABLE HYDROPHOBIC POLYPROPYLENE FIBER, MATERIAL AND METHOD FOR PREPARATION THEREOF

[75] Inventor: A. Chandler Schmalz, Conyers, Ga.

[73] Assignee: Hercules Incorporated, Wilmington, Del.

[21] Appl. No.: 473,917

[22] Filed: Jun. 7, 1995

Related U.S. Patent Documents

Reissue of:

[64] Patent No.: 4,938,832
Issued: Jul. 3, 1990
Appl. No.: 358,985
Filed: May 30, 1989

U.S. Applications:

[63] Continuation of Ser. No. 909,188, Jul. 6, 1992, abandoned.

[51] Int. Cl.[6] ..... B05D 3/02; D06M 13/00; B32B 9/00

[52] U.S. Cl. ..... 156/308.8; 156/296; 156/305; 427/393.1; 428/290; 428/369; 428/391; 524/274; 252/8.81

[58] Field of Search ..... 156/296, 305, 156/308.2, 308.6, 308.8; 428/288, 290, 369, 391; 252/8.6, 8.7, 8.61, 8.81, 8.84; 524/274; 427/389.9, 393.1

[56] References Cited

U.S. PATENT DOCUMENTS

| | | | |
|---|---|---|---|
| T917,002 | 12/1973 | Sanders . | |
| 3,009,830 | 11/1961 | Levine . | |
| 3,341,451 | 9/1967 | Duziuba et al. . | |
| 3,377,181 | 4/1968 | Kamijo et al. . | |
| 3,423,314 | 1/1969 | Campbell . | |
| 3,433,008 | 3/1969 | Gage . | |
| 3,544,462 | 12/1970 | Finch et al. . | |
| 3,652,419 | 3/1972 | Karg . | |
| 3,821,021 | 6/1974 | McMillin | 117/135.5 |
| 3,919,097 | 11/1975 | Park | 252/48.6 |
| 3,926,816 | 12/1975 | Cohen et al. . | |
| 3,983,272 | 9/1976 | Huber et al. . | |
| 4,058,489 | 11/1977 | Hellsten | 252/547 |
| 4,069,159 | 1/1978 | Hayek | 252/8.8 |
| 4,069,160 | 1/1978 | Hawkins | 252/8.9 |
| 4,072,617 | 2/1978 | Jahn | 252/8.9 |
| 4,082,887 | 4/1978 | Coates | 428/289 |
| 4,105,567 | 8/1978 | Koerner et al. | 252/8.6 |
| 4,105,569 | 8/1978 | Crossfield | 252/8.6 |
| 4,137,181 | 1/1979 | Hawkins | 252/8.9 |
| 4,143,206 | 3/1979 | Jager . | |
| 4,179,543 | 12/1979 | Hawkins | 428/361 |
| 4,273,600 | 6/1981 | Luke | 156/180 |
| 4,283,292 | 8/1981 | Marshall et al. | 252/8.8 |
| 4,285,748 | 8/1981 | Booker et al. | 156/167 |
| 4,291,093 | 9/1981 | Wishman et al. . | |
| 4,294,883 | 10/1981 | Hawkins | 428/361 |
| 4,306,929 | 12/1981 | Menikheim et al. | 156/290 |
| 4,369,134 | 1/1983 | Deguchi et al. . | |
| 4,423,092 | 12/1983 | Huhn et al. | 427/316 |
| 4,511,489 | 4/1985 | Requejo et al. | 252/172 |
| 4,535,013 | 8/1985 | Kuhn . | |
| 4,624,793 | 11/1986 | Phifer et al. | 252/8.6 |
| 4,705,704 | 11/1987 | Lane et al. . | |
| 4,717,507 | 1/1988 | Schwadtke et al. | 252/548 |
| 4,816,336 | 3/1989 | Allou, Jr. et al. | 428/361 |
| 4,837,078 | 6/1989 | Harrington | 428/284 |
| 4,965,301 | 10/1990 | Leininger . | |
| 4,995,884 | 2/1991 | Ross et al. | 8/115.6 |
| 5,033,172 | 7/1991 | Harrington | 28/107 |
| 5,045,387 | 9/1991 | Schmalz | 428/284 |
| 5,232,742 | 8/1993 | Chakravarti . | |

FOREIGN PATENT DOCUMENTS

| | | |
|---|---|---|
| 0010764 | 5/1980 | European Pat. Off. . |
| 0400622 | 12/1990 | European Pat. Off. . |
| 0486158 | 5/1992 | European Pat. Off. . |
| 2259938 | 8/1975 | France . |
| 2351152 | 5/1977 | France . |
| 1494751 | 7/1964 | Germany . |
| 828735 | 2/1960 | United Kingdom . |
| 999199 | 12/1963 | United Kingdom . |
| 1246134 | 9/1971 | United Kingdom . |
| 1533359 | 5/1976 | United Kingdom . |

OTHER PUBLICATIONS

Derwent Abstract of JP 87 052072.
Derwent Abstract of JP 87 047989.
Derwent Abstract of JP 82 002828.
Kirk–Othmer, Encyclopedia of Chemical Technology, Third Edition, vol. 22, 1983 (John Wiley & Sons) pp. 359–361.
Zimmerman et al., Supplement IV to the 1953 Edition of Handbook of Material Trade Names, p. 126.
George A. Goulston Company, Technical Data Report, entitled "Lurostat AS–Y Anionic Antistatic Agent".

*Primary Examiner*—Steven P. Griffin
*Attorney, Agent, or Firm*—Greenblum & Bernstein, P.L.C.

[57] ABSTRACT

A method for placing hydrophobic polyolefin fiber in condition for cutting, carding and production of nonwoven material without substantial sacrifice in desired hydrophobic properties in the corresponding nonwoven, by utilization of a sequential treatment of the fiber with a neutralized phosphoric acid ester and a polysiloxane of defined classes.

43 Claims, No Drawings

CARDABLE HYDROPHOBIC POLYPROPYLENE FIBER, MATERIAL AND METHOD FOR PREPARATION THEREOF

Matter enclosed in heavy brackets [ ] appears in the original patent but forms no part of this reissue specification; matter printed in italics indicates the additions made by reissue.

*This application is a continuation of application Ser. No. 07/909,188, filed Jul. 6, 1992, now abandoned.*

The present invention relates to a method utilizing topically applied modifier compositions arranged in sequence and in a unique arrangement whereby polyolefin-containing hydrophobic fiber or filament is made receptive to interim cutting and carding operations without loss of hydrophobicity in the resulting fiber or nonwoven product.

BACKGROUND

While the manufacture of polyolefin-based fiber, webs and corresponding nonwoven materials are well known in the textile art, attempts to broadly apply such knowledge to produce products in the area of personal hygiene, such as catamenial devices, disposable diapers, incontinence pads and the like, have met with serious technical problems.

In general, such products must have a fluid-absorbent core, usually comprising one or more layers of absorbent material such as wood pulp, rayon, gauze, tissue and the like and, in some cases, synthetic hydrophilic material such as a hydrophilic polyurethane foam.

Such fluid-absorbing core is most generally fabricated in the form of a thermally bonded pad, of wood pulp, fiber and conjugate fiber, having a rectangular or somewhat oval shape. To protect a wearer's clothing, and surrounding areas from stain or wetting by fluids already absorbed in such a core, a fluid-impervious barrier sheet is usually required. In general, the absorbent device is positioned against the body of the user with hydrophilic material facing and contacting the body and the fluid impervious barrier sheet positioned on the outside or opposite side.

A particularly troublesome technical problem arises when a high degree of hydrophobicity is desired in a nonwoven component produced substantially from conventionally bonded webs of hydrophobic fiber such as polyolefin-containing staple or spun-bonded webs.

In general, untreated hydrophobic fiber quickly becomes unworkable due to friction and accumulated static charge generated during conventional spinning, cutting and carding operations. For this reason, the art has long recognized and used a variety of topically applied antistatic agents which change fiber surface properties sufficiently to permit such conventional fiber processing. In effect, however, such treatment also produces fiber, web and nonwoven product which is substantially more hydrophilic than the untreated spun fiber.

Because of the nature of commercial high speed operations, and the somewhat unpredictable affinity of such agents to individual batches or bales of hydrophobic fiber, it becomes very difficult to maintain adequate control over bonding steps and over the wetting characteristics of the final nonwoven product.

It is an object of the present invention to prepare a hydrophobic polyolefin-containing spun fiber or filament for processing such as intermediate cutting and carding steps without unduly interfering with subsequent bonding steps or sacrificing needed hydrophobic characteristics in the nonwoven product.

THE INVENTION

The above objects are obtained in accordance with the present invention by preparing polyolefin-containing spun fiber or filament in accordance with the steps of A. initially treating the corresponding continuous spun fiber or filament with an effective amount, varying from about0.09%–0.5% based on fiber weight, of a first modifier composition comprising (a) about 70%–100% by weight of modifier composition of at least one neutralized phosphoric acid ester represented by the formula $$(\mathrm{Alk{-}O})_n{-}\overset{\overset{\mathrm{O}}{\|}}{\mathrm{P}}{-}(\mathrm{OR})_m \qquad (1)$$

wherein

Alk is individually defined as a lower alkyl group, such as a 1–8 carbon alkyl and preferably a 1–4 carbon alkyl group;

R is defined as an amino group or an alkali metal, n and m are individually defined as positive numbers of not less than about 1, the sum of which is about 3; and (b) up to about 30% by weight of modifier composition of at least one polysiloxane represented by the formula $$\mathrm{X{-}(\overset{\overset{\mathrm{R'}}{|}}{\underset{\underset{\mathrm{R'}}{|}}{Si}}{-}O)_o{-}Y} \qquad (2)$$

wherein

X and Y are individually defined as a hydrophobic chemical end group such as a lower alkyl group;

R' is individually defined as a lower alkyl such as a methyl group, and o is defined as a positive number within the range of about 10–50 or higher;

B. crimping the resulting continuous fiber or filament in a crimper;

C. applying to said continuous fiber or filament preferably at a point proximate to said crimper an effective amount, varying from about 0.05%–0.20% by fiber weight, of a second modifier composition comprising (a) about 70%–100%, by weight of second modifier composition, of at least one polysiloxane represented by formula (2), and (b) up to about 30%, by weight of second modifier composition, of at least one neutralized phosphoric acid ester represented by formula (1);

D. processing the resulting modifier-treated continuous fiber or filament, for spun bonding or for staple web bonding purposes, to obtain position one or more webs for bonding; and E. bonding the resulting web in a conventional manner to obtain a desired hydrophobic nonwoven material.

For present purposes the term "polyolefin-containing spun fiber or filament" includes continuous as well as staple melt spun fibers which are obtainable from conventionally blended isotactic polypropylene as well as art-recognized hydrophobic copolymers thereof with ethylene, 1-butene, 4-methylpentene-1 and the like. The resulting blended [an] *and* extruded spun melt conveniently has a weight average varying from about $3\times10^5$ to about $5\times10^5$, a molecular weight distribution of about 5.0–8.0, a melt flow rate of about 2.5 to about 4.0 g/10 minutes, and a spin temperature conveniently within a range of about 220° C.–300° C.

Also includible within the spun melt are various art-recognized fiber additives, including pH stabilizers such as calcium stearate, antioxidants, pigments, including whiteners and colorants such as $TiO_2$ and the like. Generally such additives vary, in amount, from about 0.5%–3% by weight of spun melt.

The present invention is found particularly applicable to high speed production of a variety of nonwoven materials utilizing webs obtained, for instance, from spun bonded or carded staple and may also comprise additional web components such as [fabricated] *fibrillated* film and the like. In each case, the fiber-handling difficulties generated by friction and accumulated static charge can be avoided, without unacceptable sacrifice in bonding characteristics (i.e. strength) or loss of hydrophobic properties of the final nonwoven product.

In this regard, the term "processing" as applied in process step "D" is inclusive of art recognized web formation techniques applicable to continuous as well as crimped, cut and carded staple fiber, the crimping step in the former case being optional with respect to webs formed solely of fiber or filament.

Continuous spun fiber or filaments used to form webs within the scope of the present invention preferably comprise topically treated spun melt staple fiber, filament or fibrillated film of bicomponent or monofilament types, the above-defined modifier compositions being conventionally drawn over a feed wheel partially immersed in a bath of the above-defined modifier composition, dipped therein, or sprayed in effective amount for fiber processing, and dried.

For present purposes, webs used to form nonwovens within the scope of the present invention can be formed by spun bonded, melt blown or conventional "Dry" carded Process using staple fiber and bonded together using techniques employing adhesive binders (U.S. Pat. No. 4,535,013), calender rolls, hot air, sonic, laser, pressure bonding, needle punching and the like, known to the art.

Webs used to fabricate nonwoven material can also usefully comprise conventional sheath/core or side-by-side bicomponent fiber of filament, alone or combined with treated or untreated homogeneous type fiber or filament and/or fibrillated film.

Also within the scope of the present invention is the use of nonwovens comprised of one or more bonded webs of modifier-treated polyolefin fiber and/or fiber-like (fibrillated film) components having a mixed fiber denier of homogeneous and/or bicomponent types not exceeding about 40 dpf. Such webs preferably utilize fiber or filaments within a range of about 0.1–40 dpf.

In addition, the resulting nonwoven material can be embossed and/or calender printed conventionally with various designs and colors, as desired, to increase loft, augment wet strength, and provide easy market identification.

In addition, webs used in forming nonwovens within the scope of the present invention are produced from one or more types of conventionally spun fibers or filaments having, for instance, round, delta, [trifocal] *trilobal*, or diamond cross sectional configurations.

Nonwoven cover stock of the above defined types can usefully vary in weight from about 10–45 gm $yd^2$ or higher.

The invention is further illustrated but not limited by the following Examples and Tables:

EXAMPLE 1

A. Polypropylene in flake form and characterized as follows: (crystallinity 60% $M_w$ $3.5\times10^5$, molecular weight distribution 6.4, and melt flow 3.2 g/10 minutes) is mixed in an impact blender. After thorough blending, the mixture is fed into a 1½ extruder and spun through a 210 hole spinnerette at 280° C., air quenched, and stretched at 115° C. (4×) to obtain a 2 dpf circular filament which is then passed over a feed or kiss wheel partly immersed in a tank of first modifier composition consisting of a 50% aqueous solution of Lurol® AS-Y(*1), a neutralized phosphoric acid/alcohol ester, contact being of sufficient duration and speed to topically apply about 0.6 wt. % of the dried composition. The resulting continuous filament is crimped at about 100° C. and spray coated (0.10 wt %) with a second modifier composition consisting of a 20:1 mixture by weight of a 60% polydimethyl siloxane emulsion commercially available as LE-458HS(*2) and a 50% aqueous solution of Lurol AS-Y. After air drying, the coated 2.0 dpf fiber is chopped to 1.5" length staple and set aside for conventional ASTM Sink Time tests in which a given weight of fiber is loosely packed into a mesh basket and the sink time measured in seconds. The remainder is carded into webs weighing about 20 g/$yd^2$, two webs being calender bonded at 162° C. to obtain test nonwoven material. The test nonwoven is cut into strips of convenient dimensions for carrying out conventional strength and run off tests using syn urine(*3) as the wetting fluid. Test results, are summarized and reported in Tables I and II.

*1A product of George A. Goulston Company of Situate, Mass.
*2A product of Union Carbide Corporation.
*3Syn-urine is a product of Jayco Pharmaceuticals of Camp Hill, Pa.

TABLE I

STAPLE PROPERTIES

| Sample # | Color Type | Degree of Hydrophobicity*4 | MFR | Percent Finish Tow | Percent Finish Staple | DPF | Tenacity gms | Elongation % | CPI | Spin Fin. Type/AMT | Over Fin. Type/AMT |
|---|---|---|---|---|---|---|---|---|---|---|---|
| S-1 | 195 | 5 | 17.6 | 0.77 | 0.41 | 2.6 | 2.05 | 308.7 | 28.9 | 263/0.6 | 262/0.3 |
| S-2 | 187 | 5 | 35.7 | 0.31 | 0.49 | 2.0 | — | — | — | 263/0.2 | 262/0.3 |
| S-3 | 195 | 5 | 24.3 | 0.15 | — | 2.2 | | | | 263/0.2 | 262/0.15*5 |
| S-4 | 187 | 5 | 21.7 | 0.48 | 0.48 | 2.43 | 1.68 | 402.0 | 25.1 | 263/0.2 | 262/0.3 |
| S-5 | Lt. Blue 187 | 5 | 22.2 | 0.25 | 0.38 | 2.54 | 1.72 | 424.8 | 28.5 | 263/0.2 | 262/0.3 |
| S-6 | Med. Blue 195 | 5 | 21.0 | 0.5 | 0.53 | 2.28 | 1.91 | 375.1 | 26.0 | 263/0.4 | 262/0.3 |
| S-7 | 195 | 5 | 21.0 | 0.5 | 0.51 | 2.38 | 1.86 | 373.8 | 21.5 | 263/0.4 | 262/0.3*6 |
| S-8 | 195 | 5 | 21.0 | 0.5 | 0.48 | 2.45 | 2.10 | 411.4 | 22.8 | 263/0.4 | 262/0.3*7 |
| S-9 | 195 | 5 | 21.0 | 0.5 | 0.60 | 2.43 | 1.91 | 363.0 | 22.1 | 263/0.4 | 262/0.3*8 |
| S-10 | 195 | 5 | 21.0 | 0.5 | 0.61 | 2.50 | 1.93 | 361.5 | 20.5 | 263/0.4 | 262/0.3*9 |

TABLE I-continued

STAPLE PROPERTIES

| Sample # | Color Type | Degree of Hydrophobicity*4 | MFR | Percent Finish Tow | Percent Finish Staple | DPF | Tenacity gms | Elongation % | Spin Fin. CPI | Spin Fin. Type/AMT | Over Fin. Type/AMT |
|---|---|---|---|---|---|---|---|---|---|---|---|
| S-11 | 187 Lt. Blue | 5 | | 0.42 | — | — | — | — | 30.8 | 263/0.4 | 262/0.3 |
| S-12 | 187 Med. Blue | 5 | | 0.45 | — | — | — | — | 30.8 | 263/0.4 | 262/0.3 |
| S-13 | 195 | 5 | 22.3 | 0.35 | 0.4 | 2.42 | 1.87 | 273.9 | 27.5 | 263/0.4 | 262/0.15 |
| S-14 | 187 Blue | 5 | 19.8 | 0.47 | 0.52 | 2.36 | | | 21.3 | 263/0.4 | 262/0.3 |
| S-15 | 187 Blue 225 | 5 | 20.9 | 0.56 | 0.53 | 2.42 | 1.80 | 297.0 | 27.8 | 263/0.4 | 262/0.3 |
| S-16 | 187 Blue 275 | 5 | 20.8 | 0.44 | 0.48 | 2.13 | 1.92 | 347.0 | 26.3 | 263/0.4 | 262/0.3 |

*4 1 = Fully Hydrophilic 5 = Fully Hydrophobic based on Fiber Sink Test.
*5 Added Finish No. 262 to tow with kim roll to reduce static. Total 262 add-on not known.
*6 Finish No. 262 + 0.08 Lurol AS-Y;
*7 Extra (0.24) Lurol AS-Y:
*8 Extra 0.32 Lurol AS-Y.
*9 Extra 0.72 Lurol AS-Y

TABLE II

THERMOBONDED WEB

| Staple | Bond Temp. °C. | Bond Press. Pli | Line Speed ft./min. | Strength g/in.*10 MD | Strength g/in.*10 CD | Elongation %*10 MD | Elongation %*10 CD | Run-Off % | Rewet gms. | Strike Time sec. |
|---|---|---|---|---|---|---|---|---|---|---|
| S-1 | 165 | 160 | 250 | 930 | 271 | 43 | 86 | 98.3 | *11 | *11 |
| S-2 | 160 | 160 | 250 | 892 | 288 | 27 | 70 | 99.3 | *11 | *11 |
| S-3 | 157.5 | 160 | 100 | 1294 | 325 | 30 | 77 | 97.3 | *11 | *11 |
| S-4 | 160 | 160 | 250 | 1716 | 339 | 50 | 101 | 91.2 | *11 | *11 |
| S-5 | 155 | 160 | 100 | 1500 | 423 | 37 | 87 | 94.7 | *11 | *11 |
| S-6 | 155 | 160 | 100 | 1463 | 310 | 27 | 70 | 95.9 | 0.105 | *11 |
| S-7 | 155 | 160 | 100 | 1345 | 292 | 27 | 76 | 95.0 | 0.120 | *11 |
| S-8 | 155 | 160 | 100 | 1188 | 285 | 23 | 78 | 97.1 | 0.111 | *11 |
| S-9 | 155 | 160 | 100 | 1325 | 255 | 28 | 70 | 94.1 | 0.102 | *11 |
| S-10 | 155 | 160 | 100 | 1391 | 220 | 29 | 73 | 98.8 | 0.147 | *11 |
| S-11 | 152.5 | 160 | 100 | 1244 | 257 | 31 | 71 | 93.0 | *11 | *11 |
| S-12 | 152.5 | 160 | 100 | 1389 | 294 | 37 | 80 | 95.2 | *11 | *11 |
| S-13 | 150 | 160 | 100 | *12 | *12 | *12 | *12 | 91.5 | *11 | *11 |
| S-14 | 157.5 | 160 | 100 | 1944 | 533 | 34 | 78 | 95.0 | *11 | *11 |
| S-15 | 157.5 | 160 | — | *12 | *12 | *12 | *12 | 94.9 | *11 | *11 |
| S-16 | 157.5 | 160 | 100 | 1347 | 392 | 26 | 80 | >90.0 | *11 | *11 |

*10 20 g/yd$^2$ Wet
*11 Could not test. Solution remained on surface of fabric in Run Off Test (fully hydrophobic)
*12 No determination run.

I claim:

1. A method for preparing essentially hydrophobic polyolefin-containing spun fiber or filament for cutting and carding steps in the production of hydrophobic nonwoven material, comprising A. initially treating corresponding continuous spun fiber or filament with an effective amount *for fiber or filament processing to avoid difficulties generated by friction and accumulated static charge* of a first modifier composition comprising (a) about 70%–100% by weight of modifier composition of at least one neutralized phosphoric acid ester represented by the formula $$(\mathrm{Alk{-}O})_n{-}\overset{\overset{\displaystyle O}{\|}}{\mathrm{P}}{-}(\mathrm{OR})_m \qquad (1)$$

wherein

Alk is individually defined as a lower alkyl group,

R is defined as an amino group or an alkali metal, n and m are individually defined as positive numbers of not less than [about] 1, the sum of which is about 3; and (b) up to about 30% by weight of modifier composition of at least one polysiloxane represented by the formula $$\mathrm{X{-}(\overset{\overset{\displaystyle R'}{|}}{\underset{\underset{\displaystyle R'}{|}}{Si}}{-}O)_o{-}Y} \qquad (2)$$

wherein

X and Y are defined as hydrophobic chemical end groups,

R' is individually defined as a lower alkyl group, and o is defined as a positive number [within the range] of *at least* about 10 [–50 or higher];

B. crimping the resulting continuous fiber or filament in a crimper;

C. applying to said fiber or filament an effective amount *for fiber or filament processing to avoid difficulties generated*

*by friction and accumulated static charge* of a second modifier composition comprising (a) about 70%–100%, by weight of second modifier composition, of at least one polysiloxane represented by formula (2) and (b) up to about 30%, by weight of second modifier composition, of at least one neutralized phosphoric acid ester represented by formula (1);

D. processing the resulting modifier-treated fiber or filament to obtain one or more webs for bonding; and E. bonding the resulting web to obtain a desired hydrophobic nonwoven material.

2. The method of claim 1 wherein initial treatment of said continuous spun fiber or filament is effected using about 100%, by weight of first modifier composition, of at least one neutralized phosphoric acid ester represented in formula (1).

3. The method of claim 1 wherein the Alk-O group of the neutralized ester is defined as a straight 1–4 carbon alkoxy group; n is 2; and m is 1.

4. The method of claim 1 wherein the second modifier composition is topically applied upstream of said crimper.

5. The method of claim 1 wherein the second modifier composition is topically applied to an at least partially crimped continuous spun fiber or filament.

6. The method of claim 1 wherein the "D" processing step comprises a fiber cutting and carding operation.

7. The method of claim 1 wherein the "D" "E" steps comprise a spun bonding operation.

8. A [Crimped] *crimped* essentially hydrophobic polyolefin-containing fiber obtained by A. initially treating corresponding continuous spun fiber or filament with an effective amount *for fiber or filament processing to avoid difficulties generated by friction and accumulated static charge* of a first modifier composition comprising (a) about 70%–100% by weight of modifier composition of at least one neutralized phosphoric acid ester represented by the formula $$(\mathrm{Alk{-}O})_n{-}\overset{\overset{\mathrm{O}}{\|}}{\mathrm{P}}{-}(\mathrm{OR})_m \qquad (1)$$

wherein

Alk is individually defined as a lower alkyl group,

R is defined as an amino group or an alkali metal, n and m are individually defined as positive numbers of not less than [about] 1, the sum of which is about 3; and (b) up to about 30% by weight of modifier composition of at least one polysiloxane represented by the formula $$\mathrm{X}{-}(\overset{\overset{\mathrm{R'}}{|}}{\underset{\underset{\mathrm{R'}}{|}}{\mathrm{Si}}}{-}\mathrm{O})_o{-}\mathrm{Y} \qquad (2)$$

wherein

X and Y are defined as hydrophobic chemical end groups,

R' is individually defined as a lower alkyl group, and o is defined as a positive number [within the range] of *at least* about 10 [–50 or higher];

B. crimping and applying to said fiber or filament an effective amount *for fiber or filament processing to avoid difficulties generated by friction and accumulated static charge* of a second modifier composition comprising (a) about 70%–100%, by weight of second modifier composition, of at least one polysiloxane represented by formula (2), and (b) up to about 30%, by weight of second modifier composition, of at least one neutralized phosphoric acid ester represented by formula [(I)] *(1)*.

9. The fiber of claim 8 wherein initial treatment of said continuous spun fiber or filament is effected using about 100%, by weight of first modifier composition, of at least one neutralized phosphoric acid ester represented in formula (1).

10. The fiber of claim 8 wherein the Alk-O group of the neutralized ester is defined as a straight 1–4 carbon alkoxy group; n is 2; and m is 1.

11. The fiber of claim 10 wherein the second modifier composition is topically applied upstream of said crimper.

12. The fiber of claim 9 wherein the second modifier composition is topically applied to an at least partially crimped continuous spun fiber or filament.

13. A nonwoven material [obtained in accordance with] *produced by the method recited in* claim 1.

14. A nonwoven material [obtained in accordance with] *produced by the method recited in* claim 2.

15. A nonwoven material [obtained in accordance with] *produced by the method recited in* claim 3.

16. A nonwoven material [obtained in accordance with] *produced by the method recited in* claim 4.

17. A nonwoven material [obtained in accordance with] *produced by the method recited in* claim 5.

18. A nonwoven material [obtained in accordance with] *produced by the method recited in* claim 6.

19. A nonwoven material [obtained in accordance with] *produced by the method recited in* claim 7.

*20. The method of claim 1, wherein o is defined as a positive number of about 10 to 50.*

*21. The fiber of claim 8, wherein o is defined as a positive number of about 10 to 50.*

*22. The method for preparing essentially hydrophobic polyolefin-containing fiber or filament, comprising:*

*treating continuous polyolefin-containing fiber or filament with a first composition comprising at least one neutralized phosphoric acid ester represented by the formula*

$$(\mathrm{Alk{-}O})_n{-}\overset{\overset{\mathrm{O}}{\|}}{\mathrm{P}}{-}(\mathrm{OR})_m$$

*wherein*

*Alk is individually defined as a lower alkyl group, R is defined as an amino group or an alkali metal, n and m are individually defined as positive numbers of not less than 1, the sum of which is about 3;*

*crimping the polyolefin-containing fiber or filament subsequent to treatment with the first composition; and*

*treating the crimped polyolefin-containing fiber or filament with a second composition comprising at least one neutralized phosphoric acid ester represented by the formula*

$$(\mathrm{Alk{-}O})_n{-}\overset{\overset{\mathrm{O}}{\|}}{\mathrm{P}}{-}(\mathrm{OR})_m$$

*wherein*

*Alk is individually defined as a lower alkyl group, R is defined as an amino group or an alkali metal, n and m are individually defined as positive numbers of not less than 1, the sum of which is about 3.*

*23. The method according to claim 22, wherein said first composition further comprises at least one polysiloxane.*

24. The method according to claim 23, wherein said at least one polysiloxane comprises at least one polysiloxane represented by the formula

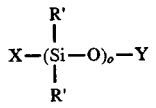

wherein

X and Y are defined as hydrophobic chemical end groups,

R' is individually defined as a lower alkyl group, and o is defined as a positive number of at least about 10.

25. The method according to claim 24, wherein o is defined as a positive member of about 10 to 50.

26. The method according to claim 24, wherein the treating comprises applying from about 0.09% to 0.5% of the first composition based on the weight of the fiber or filament.

27. The method according to claim 22, wherein said second composition further comprises at least one polysiloxane.

28. The method according to claim 27, wherein said at least one polysiloxane comprises at least one polysiloxane represented by the formula

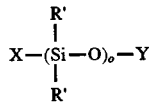

wherein

X and Y are defined as hydrophobic chemical end groups,

R' is individually defined as a lower alkyl group, and o is defined as a positive number of at least about 10.

29. The method according to claim 28, wherein the treating the continuous polyolefin-containing fiber or filament with a first composition comprises applying from about 0.09% to 0.5% of the composition based on the weight of the fiber or filament, and the treating the crimped polyolefin-containing fiber or filament with a second composition comprises applying from about 0.05% to 0.20% of the second composition based on the weight of the fiber or filament.

30. The method according to claim 27, further comprising processing the polyolefin-containing fiber or filament subsequent to treatment with the second composition to obtain at least one web, and bonding the at least one web to obtain a hydrophobic nonwoven material.

31. The method according to claim 22, further comprising processing the polyolefin-containing fiber or filament subsequent to treatment with the second composition to obtain at least one web, and bonding the at least one web to obtain a hydrophobic nonwoven material.

32. The method according to claim 22, wherein the treating comprises applying from about 0.09% to 0.5% of the first composition based on the weight of the fiber or filament.

33. The method according to claim 22, wherein the treating the continuous polyolefin-containing fiber or filament with a first composition comprises applying from about 0.09% to 0.5% of the composition based on the weight of the fiber or filament, and the treating the crimped polyolefin-containing fiber or filament with a second composition comprises applying from about 0.05% to 0.20% of the second composition based on the weight of the fiber or filament.

34. An essentially hydrophobic polyolefin-containing fiber or filament, comprising:

polyolefin-containing fiber or filament including a coating comprising at least one neutralized phosphoric acid ester represented by the formula

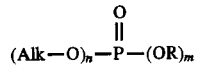

wherein

Alk is individually defined as a lower alkyl group, R is defined as an amino group or an alkali metal, n and m are individually defined as positive numbers of not less than 1, the sum of which is about 3.

35. The fiber or filament according to claim 34, wherein said coating further comprises at least one polysiloxane.

36. The fiber or filament according to claim 35, wherein said at least one polysiloxane comprises at least one polysiloxane represented by the formula

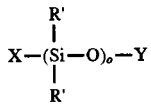

wherein

X and Y are defined as hydrophobic chemical end groups,

R' is individually defined as a lower alkyl group, and o is defined as a positive number of at least about 10.

37. The fiber or filament according to claim 36, wherein o is defined as a positive number of about 10 to 50.

38. The fiber or filament according to claim 35, wherein said fiber or filament is crimped.

39. A nonwoven material comprising the fibers of claim 35.

40. The fiber or filament according to claim 34, wherein said fiber or filament is crimped.

41. A nonwoven material comprising the fibers of claim 34.

42. A method for preparing essentially hydrophobic polyolefin-containing spun fiber or filament for cutting and carding steps in the production of hydrophobic nonwoven material, comprising A. initially treating corresponding continuous spun fiber or filament with from about 0.09% to 0.5% based on the weight of the fiber or filament of a first modifier composition comprising (a) about 70%–100% by weight of modifier composition of at least one neutralized phosphoric acid ester represented by the formula

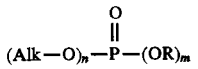

(1)

wherein

Alk is individually defined as a lower alkyl group, R is defined as an amino group or an alkali metal, n and m are individually defined as positive numbers of not less than 1, the sum of which is about 3; and (b) up to about 30% by weight of modifier composition of at least one polysiloxane represented by the formula

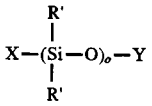

(2)

wherein

*X and Y are defined as hydrophobic chemical end groups,*

*R' is individually defined as a lower alkyl group, and o is defined as a positive number of at least about 10;*

*B. crimping the resulting continuous fiber or filament in a crimper;*

*C. applying to said fiber or filament from about 0.05% to 0.20% based on the weight of the fiber or filament of a second modifier composition comprising*

*(a) about 70%–100%, by weight of second modifier composition, of at least one polysiloxane represented by formula (2), and*

*(b) up to about 30%, by weight of second modifier composition, of at least one neutralized phosphoric acid ester represented by formula (1);*

*D. processing the resulting modifier-treated fiber or filament to obtain one or more webs for bonding; and*

*E. bonding the resulting web to obtain a desired hydrophobic nonwoven material.*

*43. A crimped essentially hydrophobic polyolefin-containing fiber obtained by*

*A. initially treating corresponding continuous spun fiber or filament with from about 0.09% to 0.5% based on the weight of the fiber or filament of a first modifier composition comprising*

*(a) about 70%–100% by weight of modifier composition of at least one neutralized phosphoric acid ester represented by the formula*

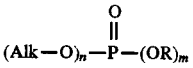

(1)

*wherein*

*Alk is individually defined as a lower alkyl group, R is defined as an amino group or an alkali metal, n and m are individually defined as positive numbers of not less than 1, the sum of which is about 3; and*

*(b) up to about 30% by weight of modifier composition of at least one polysiloxane represented by the formula*

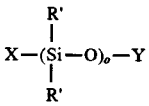

(2)

*wherein*

*X and Y are defined as hydrophobic chemical end groups,*

*R' is individually defined as a lower alkyl group, and o is defined as a positive number of at least about 10;*

*B. crimping and applying to said fiber or filament from about 0.05% to 0.20% based on the weight of the fiber or filament of a second modifier composition comprising*

*(a) about 70%–100%, by weight of second modifier composition, of at least one polysiloxane represented by formula (2), and*

*(b) up to about 30%, by weight of second modifier composition, of at least one neutralized phosphoric acid ester represented by formula (1).*

* * * * *

UNITED STATES PATENT AND TRADEMARK OFFICE

CERTIFICATE OF CORRECTION

PATENT NO. : RE. 35,621

DATED : October 7, 1997

INVENTOR(S) : A. Chandler Schmalz

It is certified that error appears in the above-indentified patent and that said Letters Patent is hereby corrected as shown below:

Claim 7, line 1 between "D" "E" insert --and--.

Signed and Sealed this

Second Day of June, 1998

*Attest:*

*Attesting Officer*

BRUCE LEHMAN

*Commissioner of Patents and Trademarks*